US012657777B2

(12) United States Patent
Tian et al.

(10) Patent No.: US 12,657,777 B2
(45) Date of Patent: Jun. 16, 2026

(54) DUPLICATE VERTICES MERGING IN MESH COMPRESSION

(71) Applicant: Tencent America LLC, Palo Alto, CA (US)

(72) Inventors: Jun Tian, Belle Mead, NJ (US); Xiang Zhang, Sunnyvale, CA (US); Xiaozhong Xu, State College, PA (US); Chao Huang, Palo Alto, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 382 days.

(21) Appl. No.: 18/208,138

(22) Filed: Jun. 9, 2023

(65) Prior Publication Data
US 2024/0095965 A1 Mar. 21, 2024

Related U.S. Application Data

(60) Provisional application No. 63/408,268, filed on Sep. 20, 2022.

(51) Int. Cl.
*G06T 9/00* (2006.01)

(52) U.S. Cl.
CPC .............. *G06T 9/001* (2013.01); *G06T 9/004* (2013.01)

(58) Field of Classification Search
CPC ....................................................... G06T 9/00
See application file for complete search history.

(56) References Cited

U.S. PATENT DOCUMENTS

| | | | | |
|---|---|---|---|---|
| 2013/0129237 A1* | 5/2013 | Yie | ......................... | G06T 9/004 |
| | | | | 382/233 |
| 2021/0090301 A1* | 3/2021 | Kim | ......................... | G06T 9/001 |
| 2023/0290010 A1* | 9/2023 | Tourapis | ................. | G06T 9/004 |
| 2023/0290011 A1* | 9/2023 | Kim | ......................... | G06T 15/04 |
| 2023/0401755 A1* | 12/2023 | Mammou | ............... | G06T 9/001 |
| 2025/0124606 A1* | 4/2025 | Zou | ......................... | G06T 9/001 |

OTHER PUBLICATIONS

"[V-CG] Apple's Dynamic Mesh Coding CfP Response", Khaled Mammou, Jungsun Kim, Alexandros Tourapis, Dimitri Podborski, Krasimir Kolarov, ISO/IEC JTC1/SC29/WG7 m59281, Online, Apr. 2022, pp. 1-24.
"[V-DMC][EE4.2] Final report", Julien Ricard, Danillo Graziosi, Olivier Mocquard, ISO/IEC JTC1/SC29/WG7 m60584, Online, Jul. 2022, pp. 1-7.
"[V-DMC] Duplicate vertices merging for lossless Draco", Wenjie Zou, Chuansheng Ju, Wei Zhang, Fuzheng Yang (Xidian University), Zhuoyi Lv (vivo), ISO/IEC JTC1/SC29/WG7 m60290, Online, Jul. 2022, pp. 1-3.

* cited by examiner

*Primary Examiner* — Ross Varndell
*Assistant Examiner* — Nhut Huy Pham
(74) *Attorney, Agent, or Firm* — ArentFox Schiff LLP

(57) ABSTRACT

In a method, a base mesh is generated from a down-sampled input mesh in a current frame, where the base mesh includes a plurality of vertices. A prediction mode to be applied to the base mesh is determined. The prediction mode is an inter prediction mode or an intra prediction mode. Based on the prediction mode being determined as the intra prediction mode, duplicate vertices among the plurality of vertices in the base mesh are merged to generate a subset of the plurality of vertices. At least the subset of the plurality of vertices is encoded based on the determined intra prediction mode to generate prediction information of at least the subset of the plurality of vertices.

20 Claims, 10 Drawing Sheets

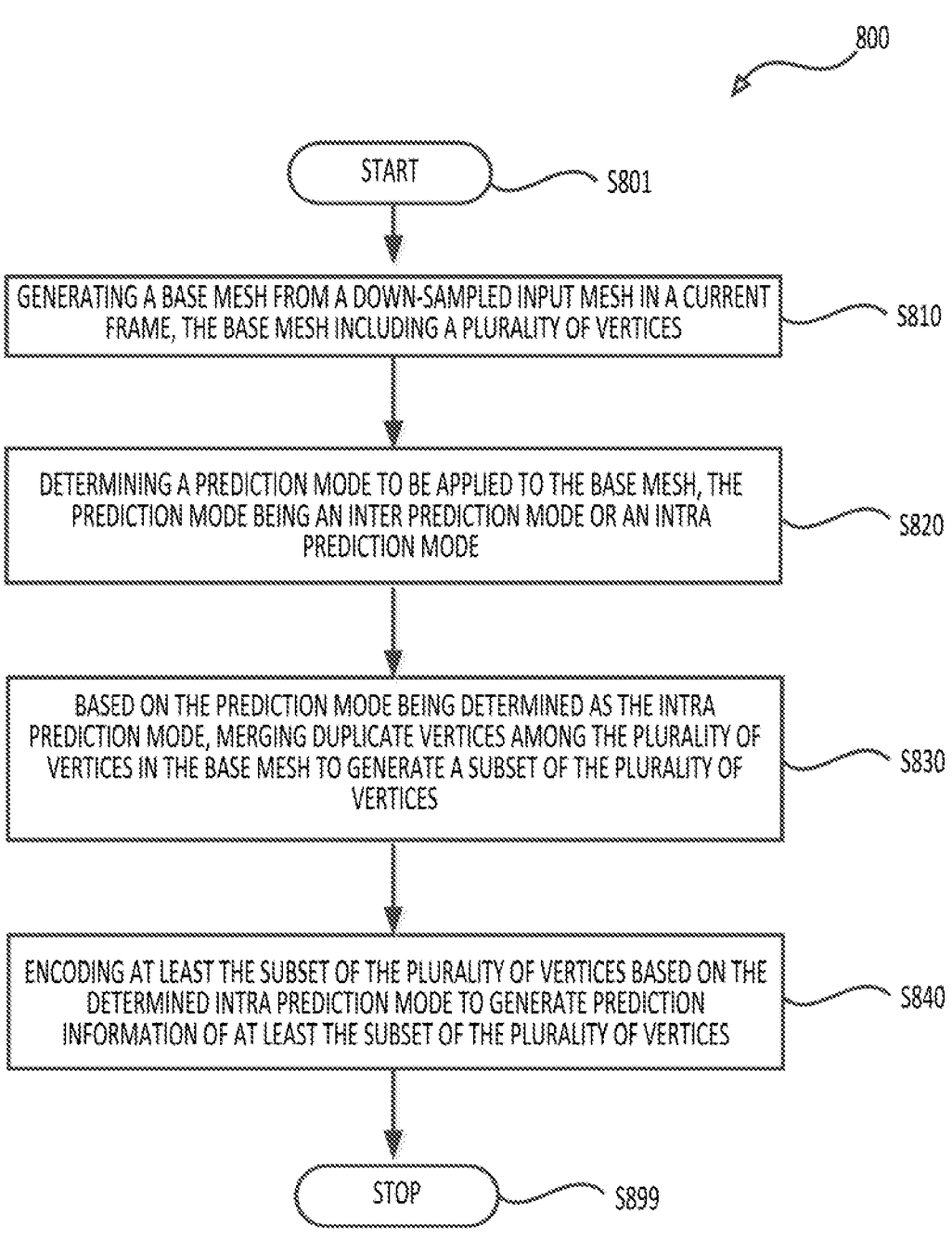

800

START — S801

GENERATING A BASE MESH FROM A DOWN-SAMPLED INPUT MESH IN A CURRENT FRAME, THE BASE MESH INCLUDING A PLURALITY OF VERTICES — S810

DETERMINING A PREDICTION MODE TO BE APPLIED TO THE BASE MESH, THE PREDICTION MODE BEING AN INTER PREDICTION MODE OR AN INTRA PREDICTION MODE — S820

BASED ON THE PREDICTION MODE BEING DETERMINED AS THE INTRA PREDICTION MODE, MERGING DUPLICATE VERTICES AMONG THE PLURALITY OF VERTICES IN THE BASE MESH TO GENERATE A SUBSET OF THE PLURALITY OF VERTICES — S830

ENCODING AT LEAST THE SUBSET OF THE PLURALITY OF VERTICES BASED ON THE DETERMINED INTRA PREDICTION MODE TO GENERATE PREDICTION INFORMATION OF AT LEAST THE SUBSET OF THE PLURALITY OF VERTICES — S840

STOP — S899

*FIG. 8*

DUPLICATE VERTICES MERGING IN MESH COMPRESSION

INCORPORATION BY REFERENCE

The present application claims the benefit of priority to U.S. Provisional Application No. 63/408,268, "Duplicate Vertices Merging in Mesh Compression" filed on Sep. 20, 2022, which is incorporated by reference herein in its entirety.

TECHNICAL FIELD

The present disclosure includes embodiments related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Advances in three-dimensional (3D) capture, modeling, and rendering have promoted ubiquitous presence of 3D content across various platforms and devices. Nowadays, it is possible to capture a baby's first step in one continent and allow grandparents of the baby to see (and in some cases interact) and enjoy a full immersive experience with the child in another continent. In order to achieve such realism, models are becoming ever more sophisticated, and a significant amount of data is linked to the creation and consumption of those models. 3D meshes are widely used to represent such immersive contents.

SUMMARY

Aspects of the disclosure provide methods and apparatuses for mesh processing. In some examples, an apparatus for mesh processing includes processing circuitry.

According to an aspect of the disclosure, a method of mesh processing performed in a video decoder is provided. In the method, a base mesh is generated from a down-sampled input mesh in a current frame, where the base mesh includes a plurality of vertices. A prediction mode to be applied to the base mesh is determined. The prediction mode is an inter prediction mode or an intra prediction mode. Based on the prediction mode being determined as the intra prediction mode, duplicate vertices among the plurality of vertices in the base mesh are merged to generate a subset of the plurality of vertices. At least the subset of the plurality of vertices is encoded based on the determined intra prediction mode to generate prediction information of at least the subset of the plurality of vertices.

In an example, the duplicate vertices in the base mesh are merged based on the prediction mode being determined as the intra prediction mode. In an example, the duplicate vertices in the base mesh are not merged based on the prediction mode being determined as the inter prediction mode.

In an example, each of the plurality of duplicate vertices is a vertex of the base mesh that shares a same reference vertex in a reference frame with another vertex in the base mesh.

In an embodiment, the merging the duplicate vertices is included in the determining the prediction mode.

In an embodiment, the merging of the duplicate vertices is included in the encoding at least the subset of the plurality of vertices.

In some embodiments, based on the prediction mode being determined as the inter prediction mode, the plurality of vertices of the base mesh is encoded. To encode the plurality of vertices of the base mesh, a reference vertex in a reference frame for each of the plurality of vertices is determined. Inter prediction information is generated for each of the plurality of vertices based on the corresponding reference vertex of the respective vertex in the reference frame.

In some embodiments, the reference vertex for each of the plurality of vertices is a collocated vertex in the reference frame of the respective vertex, where the collocated vertex is positioned at a relative same location in the reference frame as the respective vertex of the base mesh in the current frame.

According to another aspect of the disclosure, a method of mesh processing performed in an encoder is provided. In the method, a base mesh is generated from a down-sampled input mesh in a current frame, where the base mesh includes a plurality of vertices. Duplicate vertices of the plurality of vertices of the base mesh are merged to generate a merged base mesh that includes a subset of the plurality of vertices. Index information that identifies the merged duplicate vertices is generated. A prediction mode to be applied to the base mesh is determined based on the merged base mesh and the generated index information. The prediction mode is an inter prediction mode or an intra prediction mode. Inter prediction information of the base mesh is generated according to the generated index information based on the determined prediction mode being the inter prediction mode. Intra prediction information of the base mesh is generated based on the determined prediction mode being the intra prediction mode.

In an example, to determine the prediction mode, the merged duplicate vertices of the plurality of vertices are unmerged based on the index information of the merged duplicate vertices. A reference vertex in a reference frame is determined for each of the plurality of vertices of the base mesh in the current frame, where the reference frame is different from the current frame. A first prediction difference for each of the plurality of vertices of the base mesh is determined. The first prediction difference for each of the plurality of vertices indicates a difference between the reference vertex in the reference frame and the respective one of the plurality of vertices of the base mesh. A second prediction difference for each of the plurality of vertices of the base mesh is determined. The second prediction difference for each of the plurality of vertices indicates a difference between one or more neighboring vertices in the current frame of the respective one of the plurality of vertices and the respective one of the plurality of vertices.

In an example, to determine the prediction mode, a first cost value is determined as a sum of the first prediction differences associated with the plurality of vertices. A second cost value is determined as a sum of the second prediction differences associated with the plurality of vertices. The prediction mode is determined as (i) the inter prediction mode based on the first cost value being equal to or smaller than the second cost value and (ii) the intra prediction mode based on the second cost value being smaller than the first cost value.

In some embodiments, a collocated vertex in the reference frame is determined as the reference vertex for each of the plurality of vertices, where the collocated vertex is positioned at a relative same location in the reference frame as the respective vertex of the base mesh in the current frame.

In an embodiment, based on the prediction mode being determined as the inter prediction mode, the inter prediction information is generated for each of the subset of the plurality of vertices based on a corresponding reference vertex of the respective index in the reference frame.

In an embodiment, based on the prediction mode being determined as the intra prediction mode, the intra prediction information is generated for each of the subset of the plurality of vertices based on one or more neighboring vertices of the respective vertex in the current frame.

According to another aspect of the disclosure, an apparatus is provided. The apparatus includes processing circuitry. The processing circuitry can be configured to perform any of the described methods for mesh processing.

Aspects of the disclosure also provide a non-transitory computer-readable medium storing instructions which when executed by a computer cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which:

FIG. 8 shows a flow chart outlining a process according to some embodiments of the disclosure.

DETAILED DESCRIPTION OF EMBODIMENTS

Figure 1:
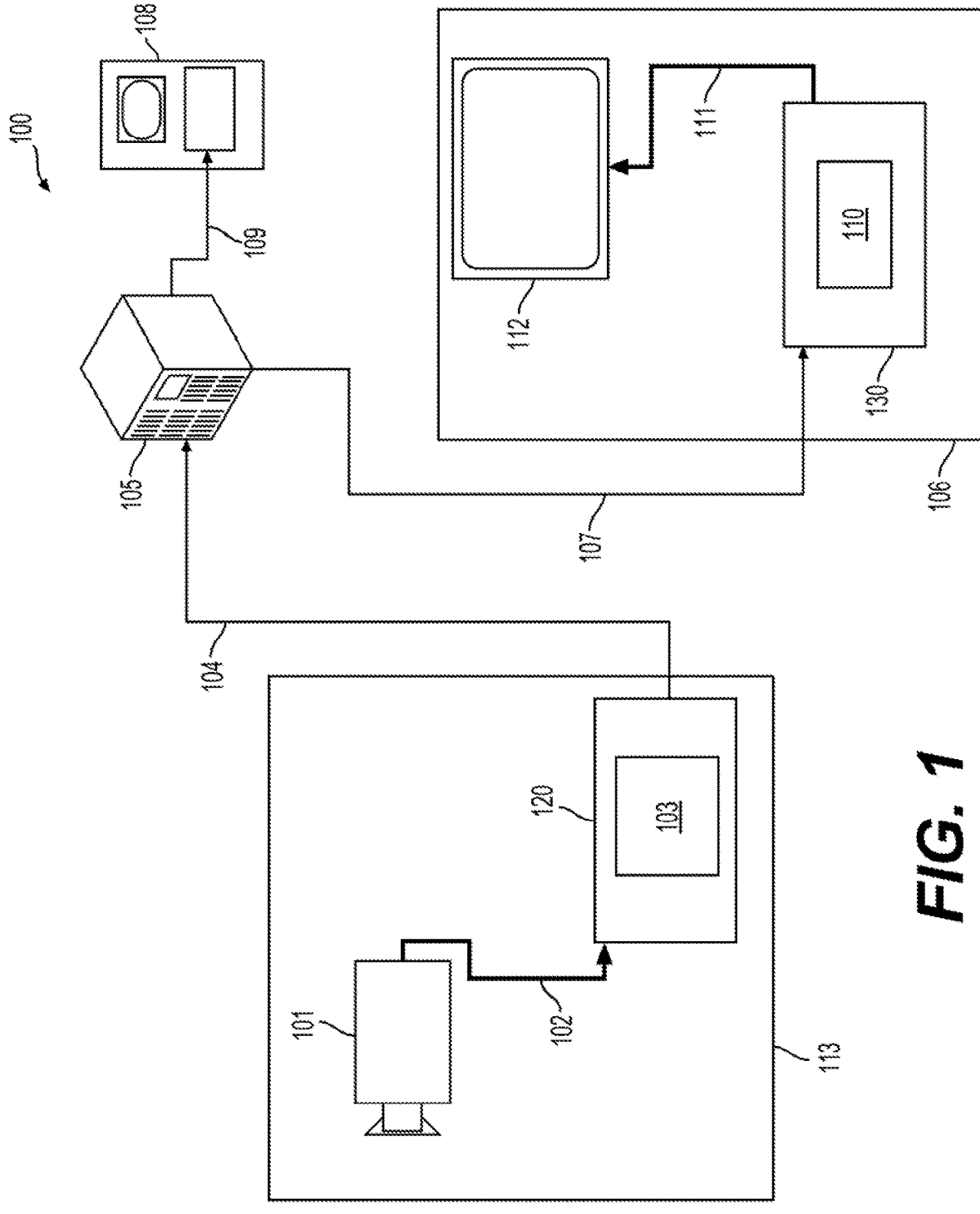
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other image and video enabled applications, including, for example, video conferencing, digital TV, streaming services, storing of compressed video on digital media including CD, DVD, memory stick and the like.

The video processing system (100) includes a capture subsystem (113), that can include a video source (101). The video source (101) can include one or more images captured by a camera and/or generated by a computer. For example, a digital camera can create a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
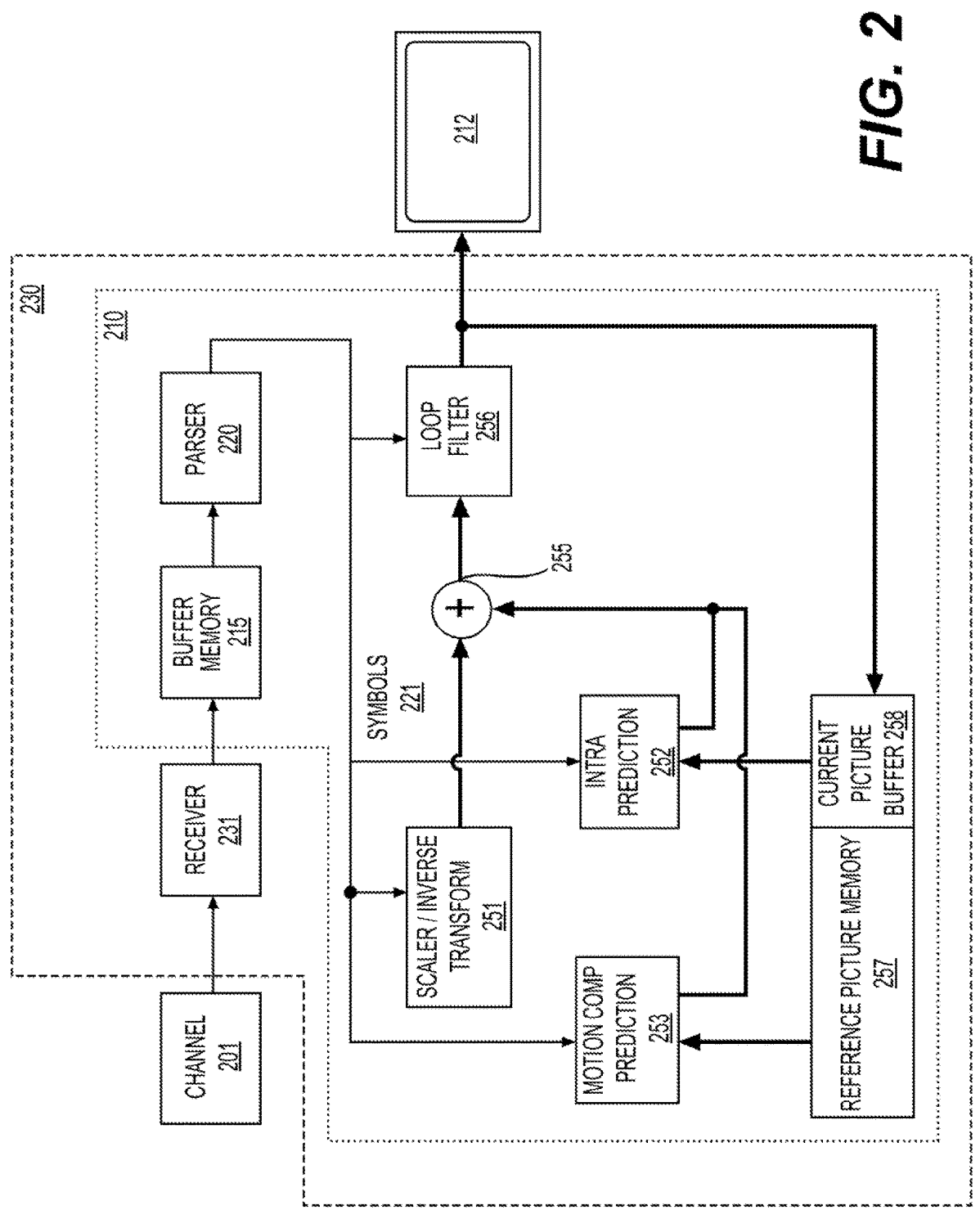
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231). The receiver (231) may include receiving circuitry, such as network interface circuitry. The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
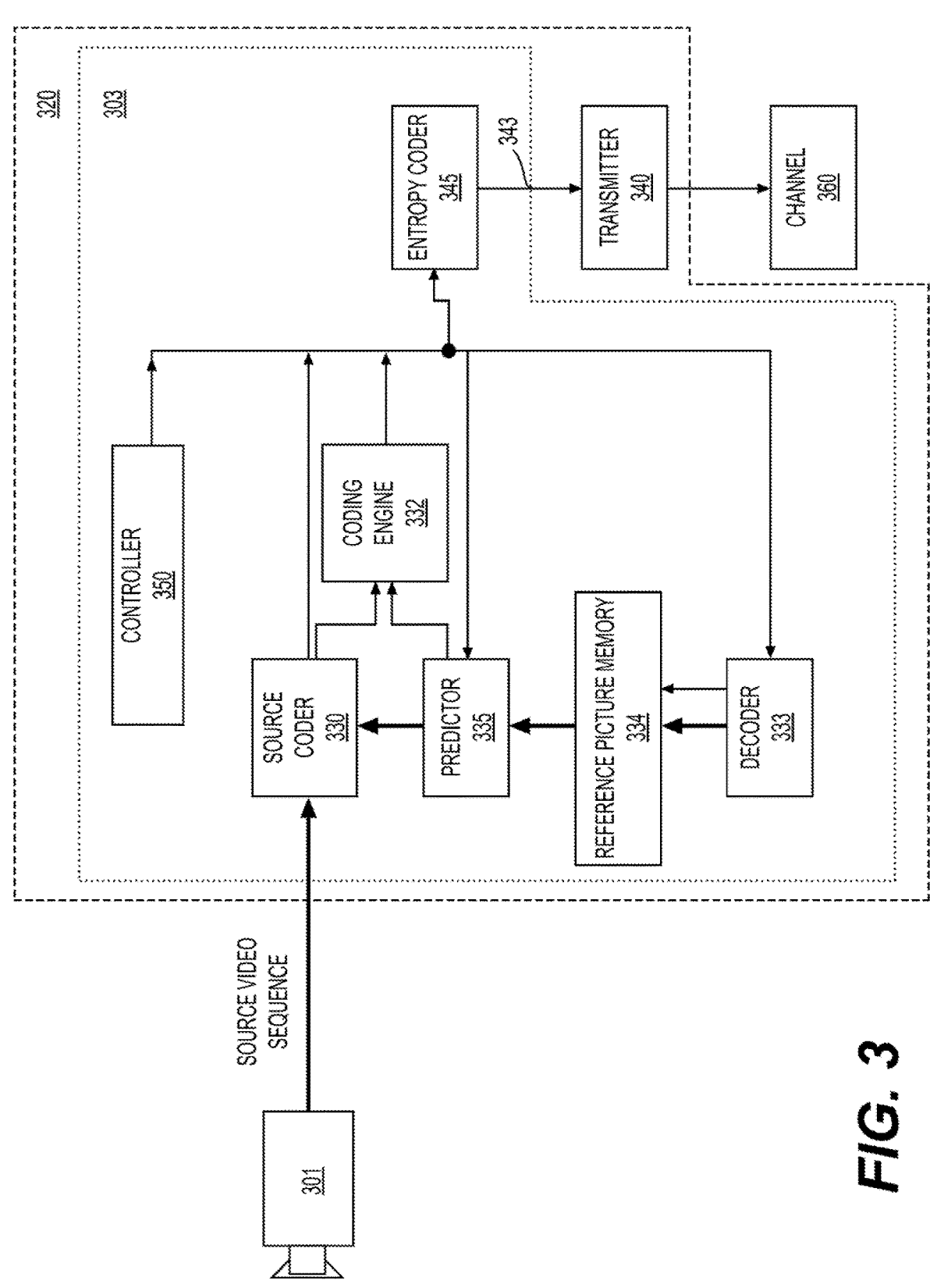
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc., in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/ SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

The disclosure includes embodiments related to methods and systems of a mesh compression using a duplicate vertex merging.

A mesh can include several polygons that describe a surface of a volumetric object. Each polygon of the mesh can be defined by vertices of the corresponding polygon in a three-dimensional (3D) space and information of how the vertices are connected, which can be referred to as connectivity information. In some embodiments, vertex attributes, such as colors, normals, etc., can be associated with the mesh vertices. Attributes (or vertex attributes) can also be associated with the surface of the mesh by exploiting mapping information that parameterizes the mesh with two-dimensional (2D) attribute maps. Such mapping can usually be described by a set of parametric coordinates, referred to as UV coordinates or texture coordinates, associated with the mesh vertices. 2D attribute maps can be used to store high resolution attribute information such as texture, normals, displacements etc. Such information can be used for various purposes such as texture mapping and shading.

A dynamic mesh sequence may require a large amount of data since the dynamic mesh can include a significant amount of information changing over time. Therefore, efficient compression technologies are required to store and transmit such contents. Mesh compression standards, such as IC, MESHGRID, and FAMC, were previously developed by MPEG to address dynamic meshes with a constant connectivity, a time varying geometry, and vertex attributes. However, these standards may not consider time varying attribute maps and connectivity information. DCC (Digital Content Creation) tools usually generate such dynamic meshes. However, it can be challenging for volumetric acquisition techniques to generate a constant connectivity dynamic mesh, especially under real time constraints. This type of content (e.g., a constant connectivity dynamic mesh) may not be supported by existing standards. MPEG is planning to develop a new mesh compression standard to directly handle dynamic meshes with time varying connectivity information and optionally time varying attribute maps. The new mesh compression standard targets lossy and lossless compression for various applications, such as real-time communications, a storage, a free viewpoint video, Augmented Reality (AR), and Virtual Reality (VR). Functionalities, such as a random access and a scalable/progressive coding, can also be considered.

Figure 4:
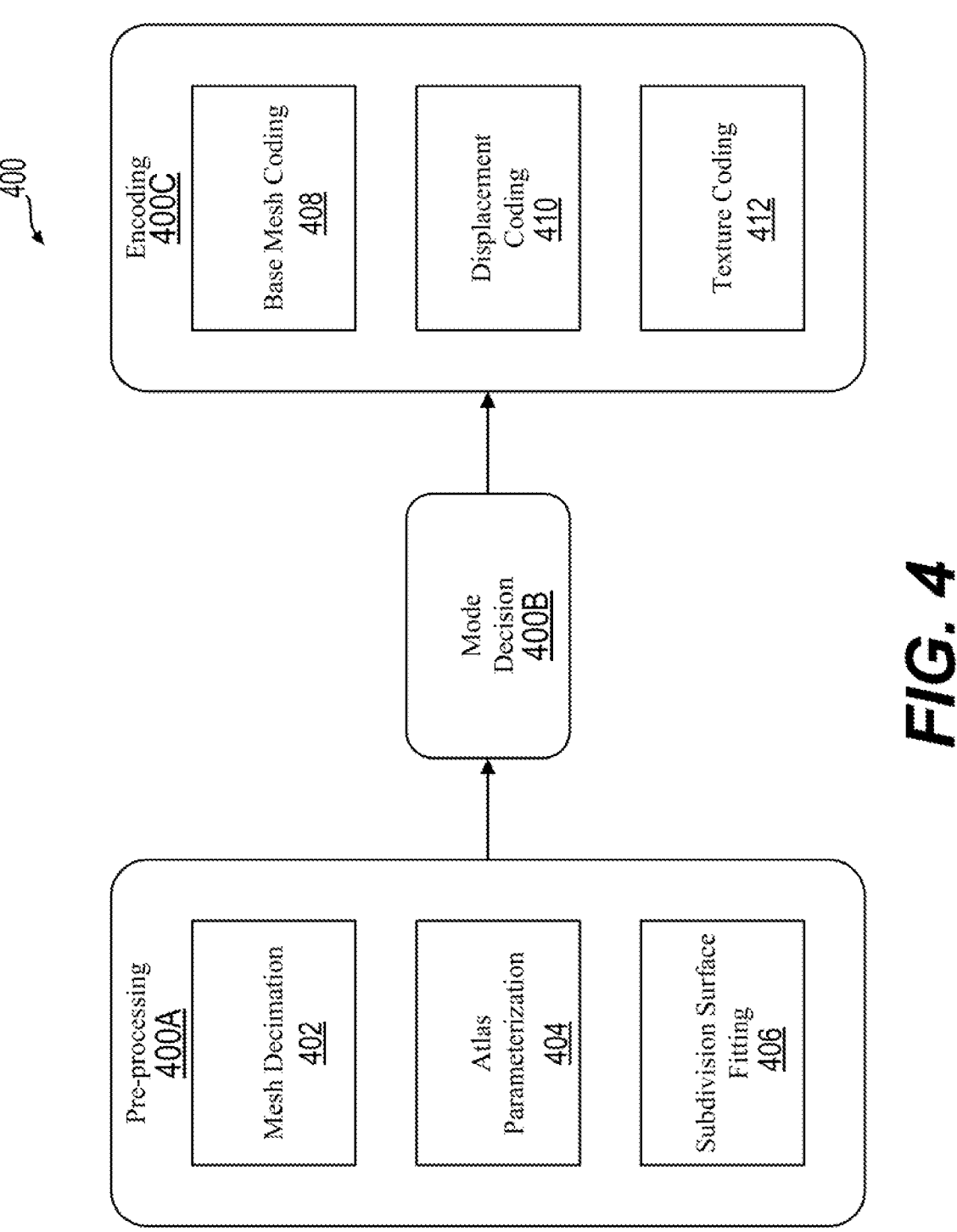
FIG. 4 is a schematic illustration of an exemplary encoding process according to some embodiments of the disclosure.

FIG. 4 shows an encoding process (400) based on a related video codec, such as MPEG V-Mesh TM v1.0. As shown in FIG. 4, the encoding process (400) can include a pre-processing stage (400A) configured to generate a base mesh and displacement vectors according to an input mesh, a mode decision stage (400B) configured to determine whether an inter frame prediction or an intra frame prediction is applied in the encoding process (400), and an encoding stage (400C) configured to encode the base mesh, the displacement vectors, and texture information of the base mesh.

Still referring to FIG. 4, the pre-processing stage (400A) can include a mesh decimation process (402), an atlas parameterization process (404), and a subdivision surface fitting process (406). The mesh decimation process (402) is configured to down-sample vertices of an input mesh M(i) to generate a decimated mesh dm(i) that includes a plurality of decimated (or down-sampled) vertices. The atlas parameterization process (404) is configured to map the decimated mesh dm(i) onto a planar domain, such as onto a UV atlas (or UV map), to generate a re-parameterized mesh pm(i). In an example, the atlas parameterization can be performed based on a video processing tool, such as UVAtlas tool. The subdivision surface fitting process (406) is configured to take the re-parameterized mesh pm(i) and the input mesh M(i) as inputs and produce a based mesh m(i) together with a set of displacements d(i). In an exemplary subdivision surface fitting process, pm(i) is subdivided by using an iterative interpolation. The iterative interpolation includes inserting at each iteration a new point in a middle of each edge of the re-parameterized mesh pm(i). The displacement field d(i) is computed by determining a nearest point on a surface of the original mesh M(i) for each vertex of the subdivided mesh.

Figure 5:
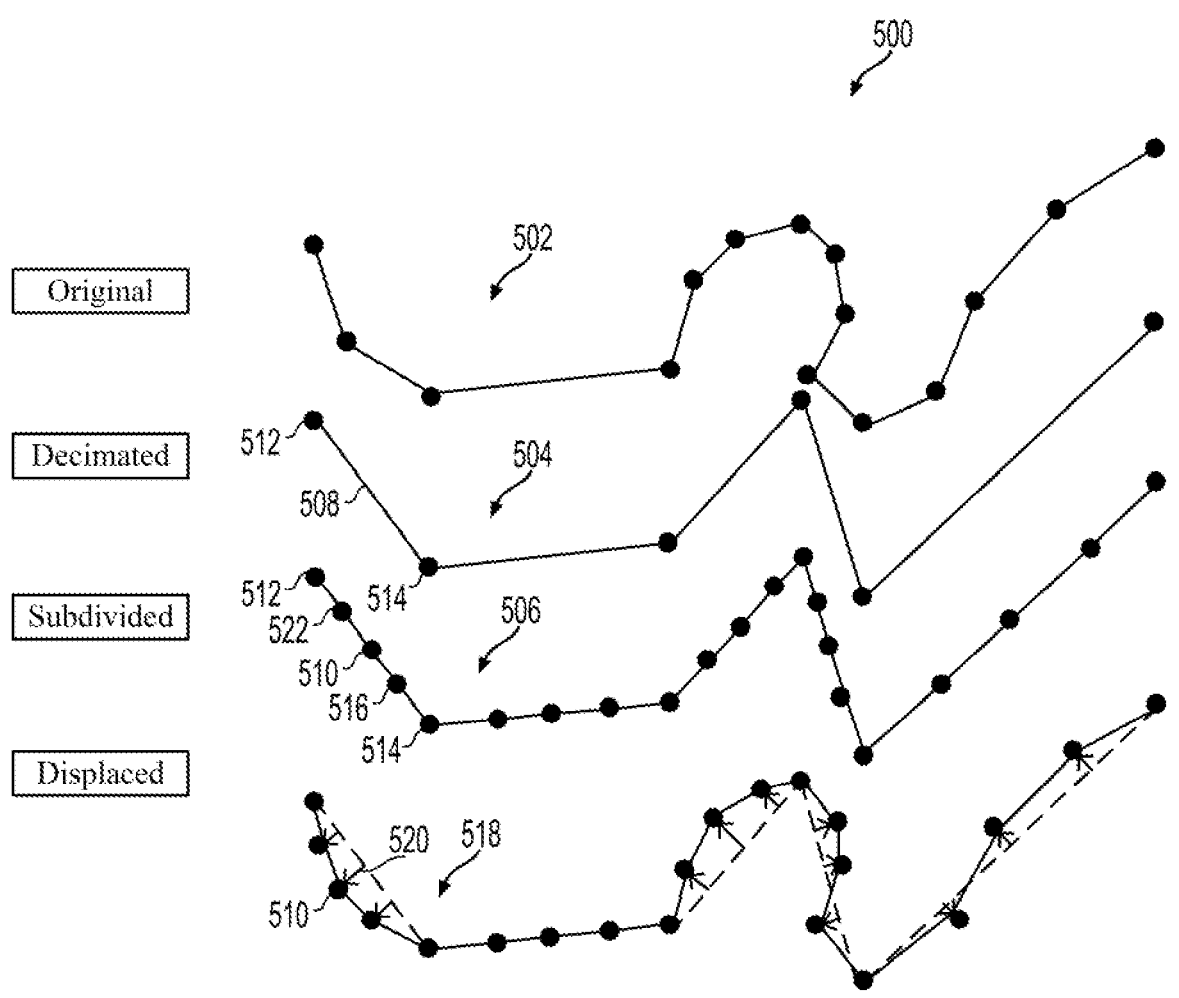
FIG. 5 is a schematic illustration of a pre-processing stage according to some embodiments of the disclosure.

FIG. 5 shows an exemplary pre-processing stage (500) to generate a base mesh and displacement vectors. As shown in FIG. 5, an input 2D curve (represented by a 2D polyline) of an input mesh can be referred to as an "original" curve (502). The original curve (502) can be down-sampled to generate a base curve/polyline, referred to as "decimated" curve (504). A subdivision scheme can then be applied to the decimated polyline (504) to generate a "subdivided" curve (506). In an example, the subdivision scheme can be an iterative interpolation scheme. The iterative interpolation scheme can include inserting at each iteration a new point in a middle of each edge of the polyline (or decimated curve) (504). For example, a point (510) can be inserted in the edge (508) of the decimated curve (504). Further, a point (522) can be added between a point (512) and the point (510), and a point (516) can be added between the point (510) and a point (514). The subdivided polyline (506) is then deformed to generate a displaced curve (518). The displaced curve (518) can be a better approximation of the original curve (502) and function as an edge of the base mesh. More precisely, a displacement vector (e.g., (520)) is computed for each vertex (e.g., (510)) of a subdivided curve (506) such that a shape of the displaced curve (518) is as close as possible to a shape of the original curve (502). A main advantage of the subdivided curve (506) is that the subdivided curve (506) has a subdivision structure that allows for more efficient compression, while offering a faithful approximation of the original curve (502).

The mode decision stage (400B) can compare a cost of an intra coding mode and a cost of an inter coding mode and decide a coding mode for each frame of the base mesh based on which one of the cost of the intra coding mode and the cost of the inter coding mode is smaller.

The encoding stage (400C) can include a base mesh coding (408), a displacement coding(410), and a texture coding (412). The base mesh coding (408) is configured to encode geometric information of the base mesh m(i) associated with a current frame. In an intra encoding, the base mesh m(i) can be first quantized (e.g., using uniform quantization) and then encoded by using a static mesh encoder. In an inter encoding, a reconstructed quantized reference base mesh m'(j) associated with a reference frame with index j is used to predict the base mesh m(i) associated with the current frame with index i. The displacement coding (410) is configured to encode a set of displacement vectors associated with the subdivided mesh vertices, referred to as a displacement field d(i). The texture coding (412) is configured to encode attribute information of the base mesh. The attribute information can include texture, normal, color, or the like. The attribute information can be encoded based on a suitable codec, such as High-Efficiency Video Coding (HEVC) or Versatile Video Coding (VVC).

Figure 6:
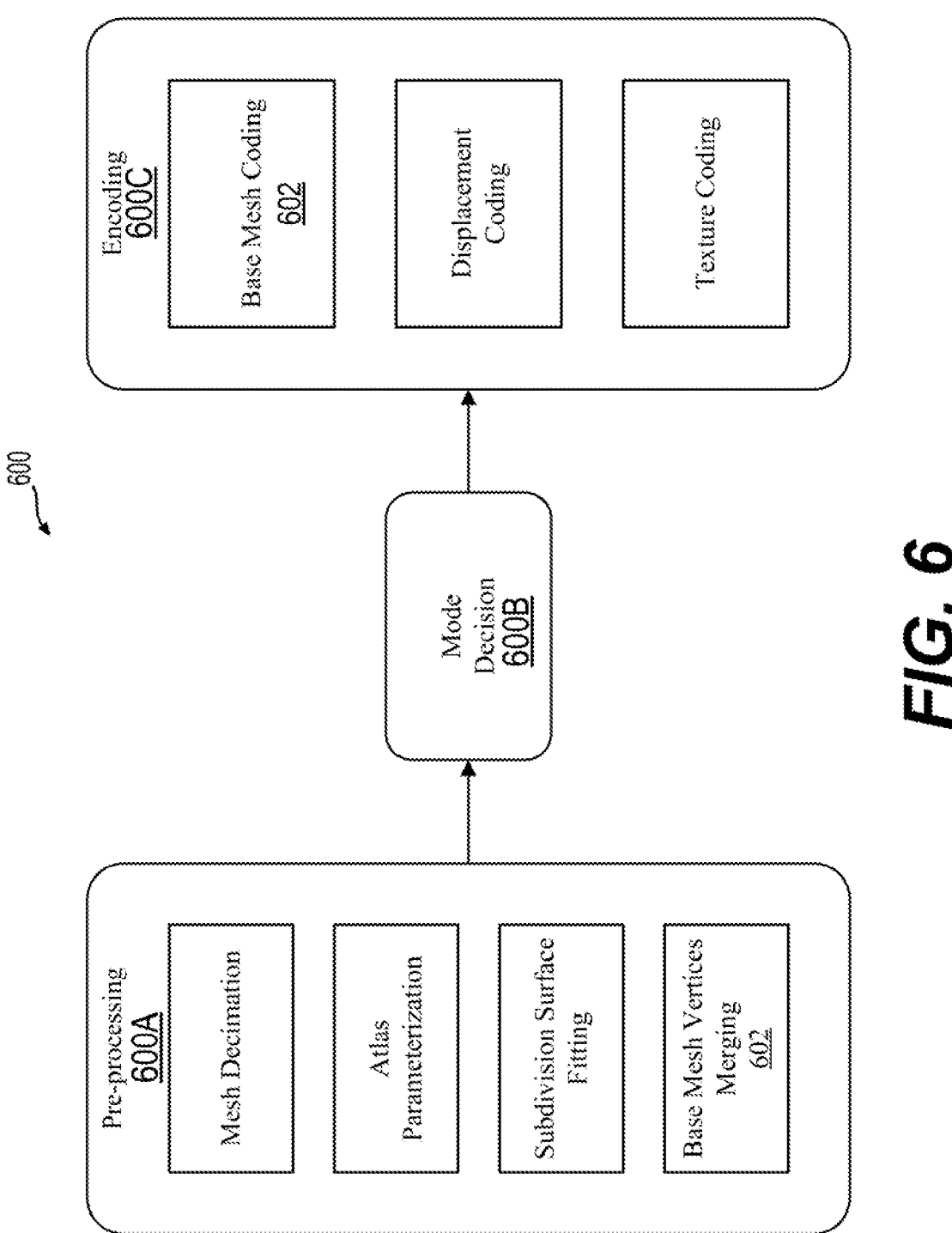
FIG. 6 is a first exemplary encoding process with vertex merging according to some embodiments of the disclosure.

FIG. 6 shows an encoding process (600) based on a duplicate vertex merging technique to improve the base mesh coding efficiency. As shown in FIG. 6, the encoding process (600) can include a vertex merging step (or base mesh vertices merging step) (602) in a pre-processing stage (600A). In an embodiment, a duplicate vertex can be a vertex of a base mesh that shares a same reference vertex in a reference frame with another vertex in the base mesh. In an embodiment, a vertex of the base mesh and a reference vertex of the vertex in the base mesh are collocated such that the reference vertex is positioned at a relative same location in the reference frame as the vertex of the base mesh in the current frame. In the vertex merge step (602), a duplicate vertex and the vertex corresponding to the duplicate vertex can be merged.

However, the coding efficiency of the encoding process with vertex merging may not be as efficient as an encoding process without vertices merging. For example, in the encoding process (600) with vertex merging, an intra coding mode may always, or may be more likely to, be chosen for every frame during the mode decision stage. One reason is that duplicate vertex merging can reduce the number of vertices and two frames (e.g., a current frame and a reference frame) may not have a one-to-one vertex correspondence (or correlation). The one-to-one vertex correspondence between the current frame and the reference frame is required for an inter coding mode. Thus, due to the lack of one-to-one vertex correspondence, a frame would choose the intra coding mode rather than the inter coding mode. Accordingly, the vertex merging can result in a coding loss because the inter prediction mode may not be selected.

In the disclosure, methods and systems of a mesh compression using a duplicate vertex merging are provided to address the coding loss due to the vertex merging. The proposed methods may be used separately or combined in any order. Further, each of the methods (or embodiments), encoder, and decoder may be implemented by processing circuitry (e.g., one or more processors or one or more integrated circuits). In an example, the one or more processors execute a program that is stored in a non-transitory computer-readable medium.

In the disclosure, duplicate vertices can be merged after a mode decision. Thus, based on a prediction mode (e.g., an inter coding mode or an intra coding mode) that is determined at the mode decision stage (e.g., (400B), the duplicate vertices can be merged. In some embodiments, the duplicate vertex merging may be applied to frames under an intra coding mode.

Figure 7:
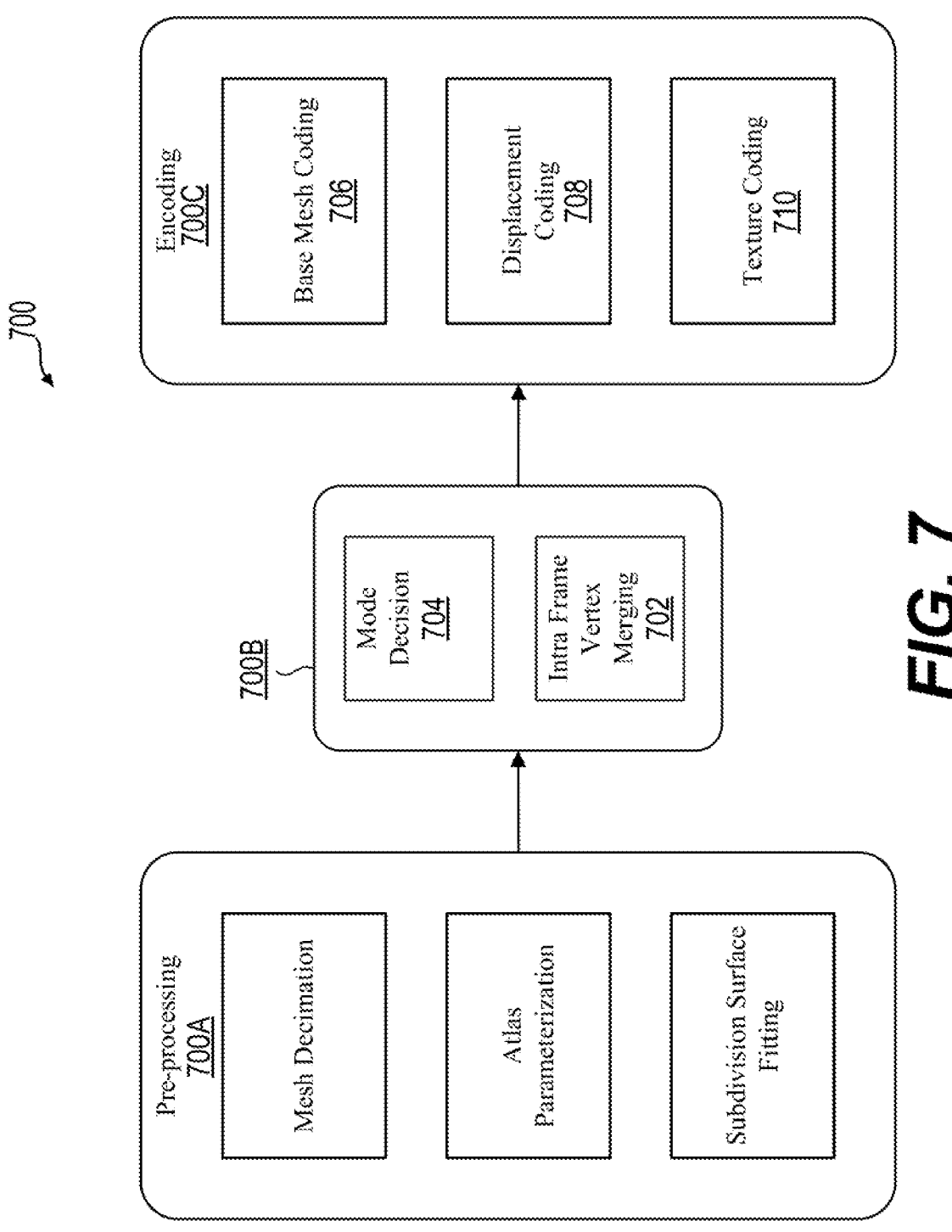
FIG. 7 is a second exemplary encoding process with vertex merging according to some embodiments of the disclosure.

In an embodiment, a mode decision and a duplicate vertices merging can be placed in a second stage (or mode decision stage) of an encoding process. For example, as illustrated in FIG. 7, an encoding process (700) can include a first stage (or a pre-processing stage) (700A), a second stage (700B), and a third stage (or encoding stage) (700C). The second stage (700B) can include a mode decision step (704) and a vertex merging step (or intra frame vertex merging) (702). The third stage (or encoding stage) (700C) can include a base mesh coding (706), a displacement coding (708), and a texture coding (710). The mode decision step (704) is configured to determine whether an inter coding mode or an intra coding mode is applied to a frame associated with a base mesh. According to the encoding process (700), after a coding mode is determined at the mode decision step (704), if the coding mode of a frame is determined as the intra coding mode, the duplicate vertex merging can be applied to the base mesh. If the coding mode of a frame is determined as the inter coding mode, the duplicate vertex merging may not be applied to the frame.

In an embodiment, a duplicate vertex merging can be placed in the third stage, such as the encoding stage (700C). In an example, the duplicate vertex merging can be placed prior to the base mesh coding (706). Accordingly, when the coding mode of a frame of a base mesh is determined as an intra coding mode, the duplicate vertex merging can be applied to the base mesh to generate a merged base mesh. The merged base mesh can include a subset of the plurality of vertices of the base mesh. Vertices in the subset of the plurality of vertices can be unique or non-repeated. The merged base mesh can further be encoded in the base mesh coding (706) according to the intra coding mode. Thus, the base mesh coding (706) is performed on the merged based mesh, and input information for the base mesh coding (706) can be reduced due to the duplicate vertices being merged (or skipped). When the coding mode of a frame is determined as an inter coding mode, the duplicate vertices merging may not be applied to the frame.

In an embodiment, a duplicate vertex merging can be placed (or implemented) inside the base mesh coding (e.g., (706)) of the encoding stage (e.g., (700C)). Thus, the base mesh coding (e.g., (706)) is applied on the base mesh. Accordingly, the base mesh coding can include two sub-steps. In a first sub-step, duplicate vertices of the base mesh can be identified. For example, a vertex of the base mesh can be determined as a duplicate vertex when the vertex and another vertex of the base mesh have a same reference vertex in a reference frame. In a second step, the base mesh can be encoded based on a coding mode that is determined at the mode decision step (e.g., (704)). For example, during the base mesh coding, if the coding mode of a frame of the base mesh is determined as an intra coding mode, the duplicate vertices merging can be applied to the base mesh to generate a merged base mesh that includes a subset of a plurality of vertices of the base mesh. The subset of the plurality of vertices can further be coded based on a static mesh codec. When the coding mode of a frame of a base mesh is determined as an inter coding mode, the duplicate vertex merging may not be applied, and a motion field coding can be applied to the base mesh. Comparing to the base mesh coding in which the duplicate vertex merging is placed prior to the base mesh coding, the base mesh coding in which the duplicate vertex merging is placed inside the encoding stage receives more input information because the duplicate vertices are not merged before the base mesh coding.

In an embodiment, a duplicate vertex merging can be performed before a mode decision. In an example, the duplicate vertex merging can be placed in the first stage prior to mode decision, which can be shown in FIG. 6. As shown in FIG. 6, once the duplicate vertices are merged in the base mesh vertices merging step (602) of the pre-processing stage (600A) to generate a merged base mesh, information of the merged vertices can be signaled and sent to the mode decision stage (600B). The merged vertices information may include indices in some examples. Accordingly, in the mode decision stage (600B), the indices of the merged vertices can be identified. Based on the indices of the merged vertices, the merged vertices can be unmerged. Thus, the number of the vertices in the current frame is not reduced, and one-to-one vertex correspondence (or correlation) of cross frames (e.g., between a current frame and a reference frame) can be established. Further, an intra coding mode or inter coding mode may be selected, by comparing a cost (or prediction cost) of the intra coding mode and a cost of the inter coding mode. Once the prediction mode (or coding mode) is determined at the mode decision stage (600B), whether the base mesh or the merged base mesh is encoded at the base mesh coding (602) is determined based on the determined prediction mode. For example, when the intra prediction mode (or intra coding mode) is determined at the mode decision stage (600B), the base mesh coding (602) can encode the merged base mesh in which the duplicate vertices are merged. When the inter prediction mode (or inter coding mode) is determined at the mode decision stage (600B), the base mesh coding (602) can encode the base mesh.

Figure 9:
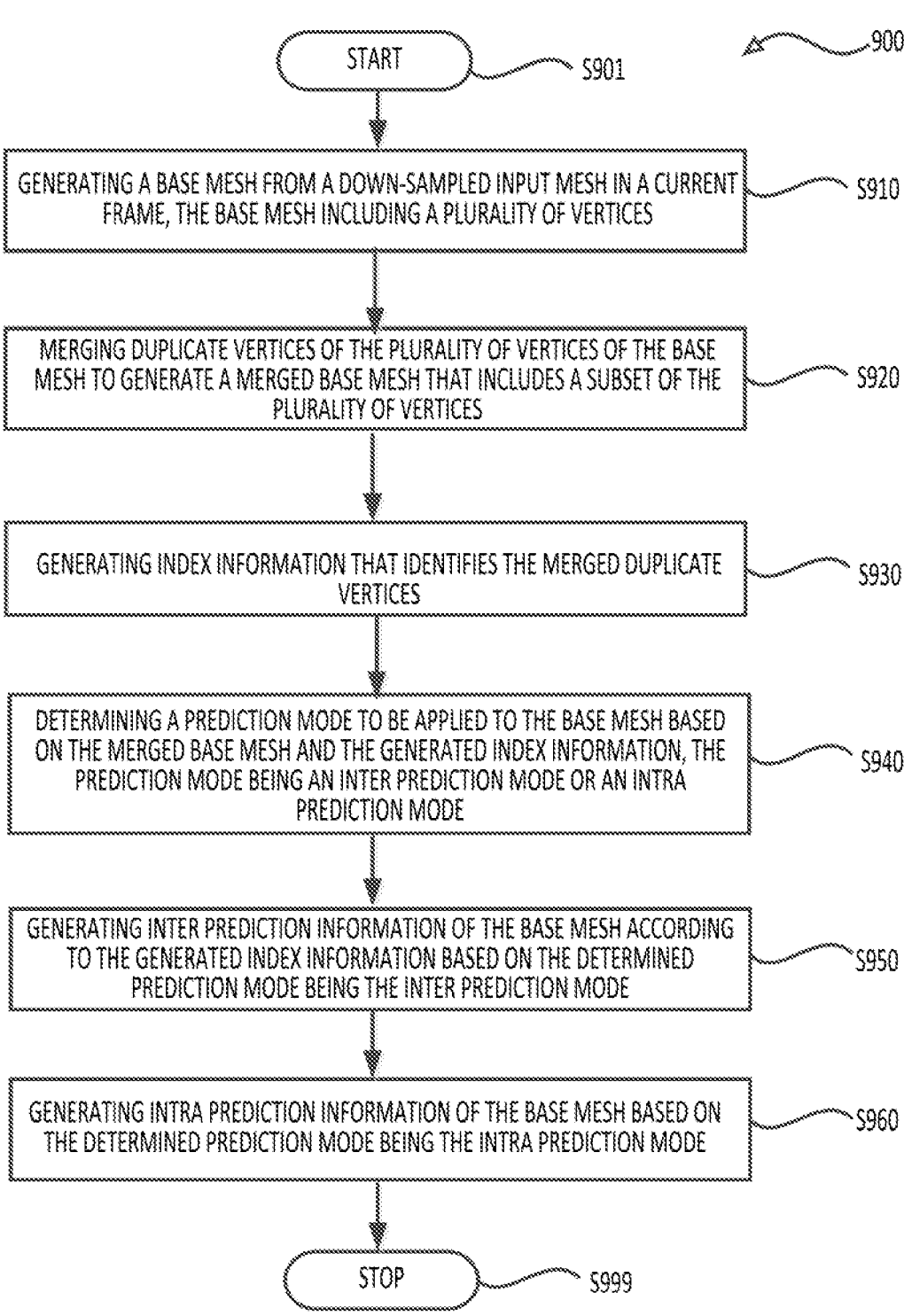
FIG. 9 shows a flow chart outlining another process according to some embodiments of the disclosure.

FIG. 8 shows a flow chart outlining a first decoding process (800) and FIG. 9 shows a flow chart outlining a second decoding process (900), according to embodiments of the disclosure. The process (800) and the process (900) can be used in a decoder, such as a video decoder. In various embodiments, the process (800) and the process (900) can be executed by processing circuitry, such as the processing circuitry that performs functions of the video decoder (110), the processing circuitry that performs functions of the video decoder (210), and the like. In some embodiments, the process (800) and the process (900) are implemented in software instructions, thus when the processing circuitry executes the software instructions, the processing circuitry performs the process (800) and the process (900) respectively.

In an example, the process (800) starts at (S801) and proceeds to (S810).

At (S810), a base mesh is generated from a down-sampled input mesh in a current frame, where the base mesh includes a plurality of vertices.

At (S820), a prediction mode to be applied to the base mesh is determined. The prediction mode is an inter prediction mode or an intra prediction mode.

At (S830), based on the prediction mode being determined as the intra prediction mode, duplicate vertices among the plurality of vertices in the base mesh are merged to generate a subset of the plurality of vertices.

At (S840), at least the subset of the plurality of vertices is encoded based on the determined intra prediction mode to generate prediction information of at least the subset of the plurality of vertices.

In an example, the duplicate vertices in the base mesh are merged based on the prediction mode being determined as the intra prediction mode. In an example, the duplicate vertices in the base mesh are not merged based on the prediction mode being determined as the inter prediction mode.

In an example, each of the plurality of duplicate vertices is a vertex of the base mesh that shares a same reference vertex in a reference frame with another vertex in the base mesh.

In an embodiment, the merging the duplicate vertices is included in the determining the prediction mode.

In an embodiment, the merging of the duplicate vertices is included in the encoding at least the subset of the plurality of vertices.

In some embodiments, based on the prediction mode being determined as the inter prediction mode, the plurality of vertices of the base mesh is encoded. To encode the plurality of vertices of the base mesh, a reference vertex in a reference frame for each of the plurality of vertices is determined. Inter prediction information is generated for each of the plurality of vertices based on the corresponding reference vertex of the respective vertex in the reference frame.

In some embodiments, the reference vertex for each of the plurality of vertices is a collocated vertex in the reference frame of the respective vertex, where the collocated vertex is positioned at a relative same location in the reference frame as the respective vertex of the base mesh in the current frame.

Then, the process proceeds to (S899) and terminates.

The process (800) can be suitably adapted. Step(s) in the process (800) can be modified and/or omitted. Additional step(s) can be added. Any suitable order of implementation can be used.

In an example, the process (900) starts at (S901) and proceeds to (S910).

At (S910), a base mesh is generated from a down-sampled input mesh in a current frame, where the base mesh includes a plurality of vertices.

At (S920), duplicate vertices of the plurality of vertices of the base mesh are merged to generate a merged base mesh that includes a subset of the plurality of vertices.

At (S930), index information that identifies the merged duplicate vertices is generated.

At (S940), a prediction mode to be applied to the base mesh is determined based on the merged base mesh and the generated index information. The prediction mode is an inter prediction mode or an intra prediction mode.

At (S950), inter prediction information of the base mesh is generated according to the generated index information based on the determined prediction mode being the inter prediction mode.

At (S960), intra prediction information of the base mesh is generated based on the determined prediction mode being the intra prediction mode.

In an example, to determine the prediction mode, the merged duplicate vertices of the plurality of vertices are unmerged based on the index information of the merged duplicate vertices. A reference vertex in a reference frame is determined for each of the plurality of vertices of the base mesh in the current frame, where the reference frame is different from the current frame. A first prediction difference for each of the plurality of vertices of the base mesh is determined. The first prediction difference for each of the plurality of vertices indicates a difference between the reference vertex in the reference frame and the respective one of the plurality of vertices of the base mesh. A second prediction difference for each of the plurality of vertices of the base mesh is determined. The second prediction difference for each of the plurality of vertices indicates a difference between one or more neighboring vertices in the current frame of the respective one of the plurality of vertices and the respective one of the plurality of vertices.

In an example, to determine the prediction mode, a first cost value is determined as a sum of the first prediction differences associated with the plurality of vertices. A second cost value is determined as a sum of the second prediction differences associated with the plurality of vertices. The prediction mode is determined as (i) the inter prediction mode based on the first cost value being equal to or smaller than the second cost value and (ii) the intra prediction mode based on the second cost value being smaller than the first cost value.

In some embodiments, a collocated vertex in the reference frame is determined as the reference vertex for each of the plurality of vertices, where the collocated vertex is positioned at a relative same location in the reference frame as the respective vertex of the base mesh in the current frame.

In an embodiment, based on the prediction mode being determined as the inter prediction mode, the inter prediction information is generated for each of the subset of the plurality of vertices based on a corresponding reference vertex of the respective index in the reference frame.

In an embodiment, based on the prediction mode being determined as the intra prediction mode, the intra prediction information is generated for each of the subset of the plurality of vertices based on one or more neighboring vertices of the respective vertex in the current frame.

Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
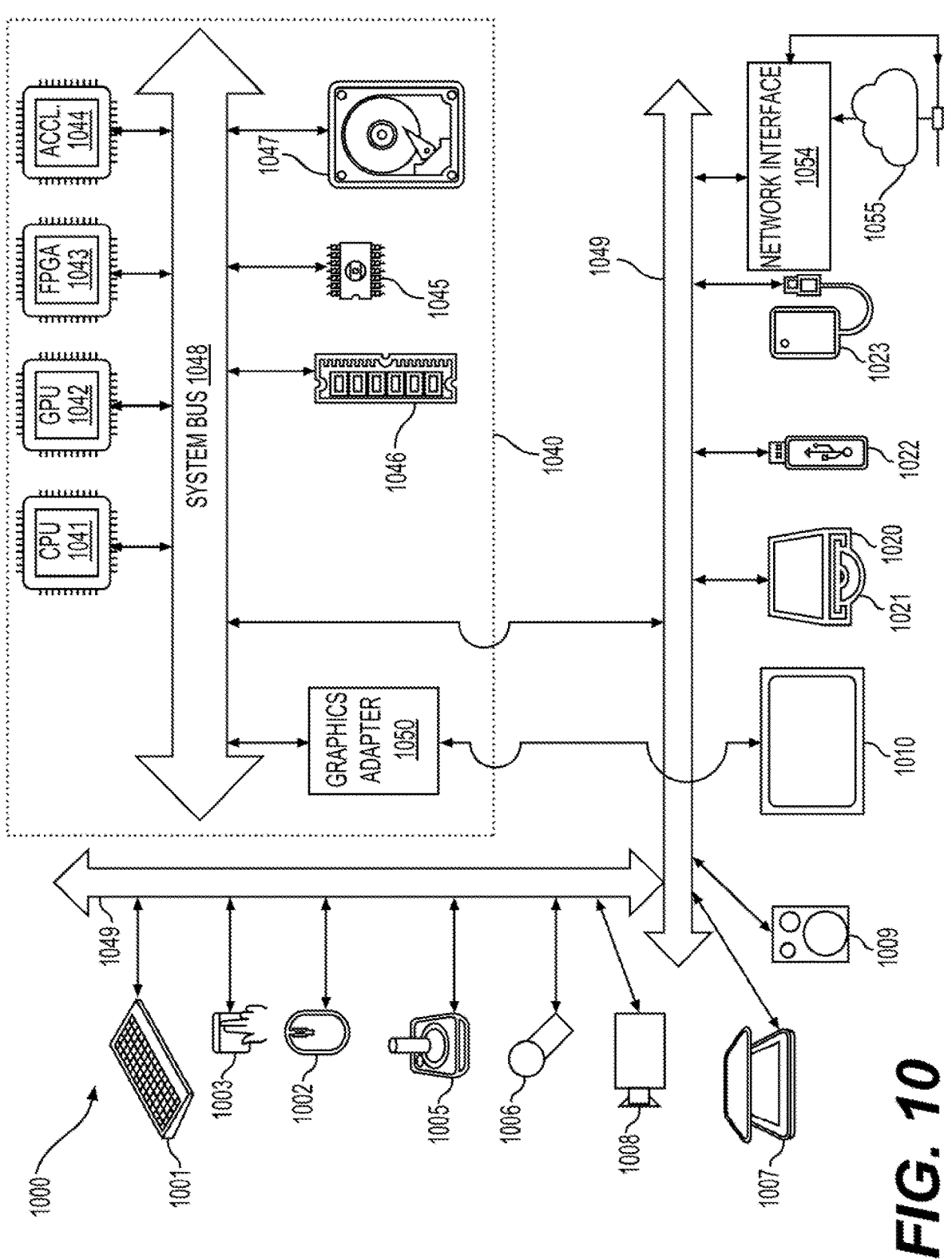
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein.

Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing performed in an encoder, the method comprising:

generating a base mesh from a down-sampled input mesh in a current frame, the base mesh including a plurality of vertices;

determining a prediction mode to be applied to the base mesh, the prediction mode being an inter prediction mode or an intra prediction mode;

when the prediction mode is determined as the intra prediction mode, merging duplicate vertices among the plurality of vertices in the base mesh to generate a subset of the plurality of vertices, the duplicate vertices corresponding to a same reference vertex in a reference frame; and encoding at least the subset of the plurality of vertices based on the determined intra prediction mode to generate prediction information of at least the subset of the plurality of vertices.

2. The method of claim 1, wherein:

the duplicate vertices in the base mesh are merged when the prediction mode is determined as the intra prediction mode, and the duplicate vertices in the base mesh are not merged when the prediction mode is determined as the inter prediction mode.

3. The method of claim 1, wherein each of the duplicate vertices is a vertex of the base mesh that shares the same reference vertex in the reference frame with another vertex in the base mesh.

4. The method of claim 1, wherein the merging the duplicate vertices is included in the determining the prediction mode.

5. The method of claim 1, wherein the merging of the duplicate vertices is included in the encoding at least the subset of the plurality of vertices.

6. The method of claim 1, further comprising:

when the prediction mode is determined as the inter prediction mode, encoding the plurality of vertices of the base mesh, wherein the encoding the plurality of vertices of the base mesh further comprises:

determining a reference vertex in the reference frame for each a first vertex of the plurality of vertices; and generating inter prediction information for the first vertex of the plurality of vertices based on the corresponding reference vertex of the first vertex in the reference frame.

7. The method of claim 6, wherein the reference vertex for the first vertex of the plurality of vertices is a collocated vertex in the reference frame of the first vertex, the collocated vertex being positioned at a relative same location in the reference frame as the first vertex of the base mesh in the current frame.

8. A method of mesh processing performed in an encoder, the method comprising:

generating a base mesh from a down-sampled input mesh in a current frame, the base mesh including a plurality of vertices;

merging duplicate vertices of the plurality of vertices of the base mesh to generate a merged base mesh that includes a subset of the plurality of vertices, the duplicate vertices corresponding to a same reference vertex in a reference frame;

generating index information that identifies the merged duplicate vertices;

determining a prediction mode to be applied to the base mesh based on the merged base mesh and the generated index information, the prediction mode being an inter prediction mode or an intra prediction mode;

generating inter prediction information of the base mesh according to the generated index information when the determined prediction mode is the inter prediction mode; and generating intra prediction information of the base mesh based on when the determined prediction mode being is the intra prediction mode.

9. The method of claim 8, wherein the determining the prediction mode further comprises:

unmerging the merged duplicate vertices of the plurality of vertices based on the index information of the merged duplicate vertices;

determining a reference vertex in the reference frame for a first vertex of the plurality of vertices of the base mesh in the current frame, the reference frame being different from the current frame;

determining a first prediction difference for the first vertex of the plurality of vertices of the base mesh, the first prediction difference for the first vertex of the plurality of vertices indicating a difference between the reference vertex in the reference frame and the first vertex of the plurality of vertices of the base mesh; and determining a second prediction difference for the first vertex of the plurality of vertices of the base mesh, the second prediction difference for the first vertex of the plurality of vertices indicating a difference between one or more neighboring vertices in the current frame of the first vertex of the plurality of vertices and the first vertex of the plurality of vertices.

10. The method of claim 9, wherein the determining the prediction mode further comprises:

determining a first cost value as a sum of first prediction differences associated with the plurality of vertices;

determining a second cost value as a sum of second prediction differences associated with the plurality of vertices; and determining the prediction mode as (i) the inter prediction mode when the first cost value is equal to or smaller than the second cost value and (ii) the intra prediction mode when the second cost value is smaller than the first cost value.

11. The method of claim 9, wherein the determining the reference vertex further comprises:

determining a collocated vertex in the reference frame as the reference vertex for the first vertex of the plurality of vertices, the collocated vertex being positioned at a relative same location in the reference frame as the first vertex of the base mesh in the current frame.

12. The method of claim 9, wherein the generating the inter prediction information of the base mesh further comprises:

when the prediction mode is determined as the inter prediction mode, generating the inter prediction information for a first vertex of the subset of the plurality of vertices based on a corresponding reference vertex of the first vertex of the subset of the plurality of vertices in the reference frame.

13. The method of claim 9, wherein the generating the intra prediction information of the base mesh further comprises:

when the prediction mode is determined as the intra prediction mode, generating the intra prediction information for a first vertex of the subset of the plurality of vertices based on one or more neighboring vertices of the first vertex of the subset of the plurality of vertices in the current frame.

14. A non-transitory computer-readable storage medium storing instructions which, when executed by a processor, cause the processor to perform an encoding method comprising:

generating a base mesh from a down-sampled input mesh in a current frame, the base mesh including a plurality of vertices;

determining a prediction mode to be applied to the base mesh, the prediction mode being an inter prediction mode or an intra prediction mode;

when the prediction mode is determined as the intra prediction mode, merging duplicate vertices among the plurality of vertices in the base mesh to generate a subset of the plurality of vertices, the duplicate vertices corresponding to a same reference vertex in a reference frame; and encoding at least the subset of the plurality of vertices based on the determined intra prediction mode to generate prediction information of at least the subset of the plurality of vertices.

15. The non-transitory computer-readable storage medium of claim 14, wherein:

the duplicate vertices in the base mesh are merged when the prediction mode is determined as the intra prediction mode, and the duplicate vertices in the base mesh are not merged when the prediction mode is determined as the inter prediction mode.

16. The non-transitory computer-readable storage medium of claim 14, wherein each of the duplicate vertices is a vertex of the base mesh that shares the same reference vertex in the reference frame with another vertex in the base mesh.

17. The non-transitory computer-readable storage medium of claim 14, wherein the merging the duplicate vertices is included in the determining the prediction mode.

18. The non-transitory computer-readable storage medium of claim 14, wherein the merging of the duplicate vertices is included in the encoding at least the subset of the plurality of vertices.

19. The non-transitory computer-readable storage medium of claim 14, wherein the encoding method further comprises:

when the prediction mode is determined as the inter prediction mode, determining a reference vertex in the reference frame for a first vertex of the plurality of vertices; and generating inter prediction information for the first vertex of the plurality of vertices based on the corresponding reference vertex of the first vertex in the reference frame.

20. The non-transitory computer-readable storage medium of claim 19, wherein the reference vertex for the first vertex of the plurality of vertices is a collocated vertex in the reference frame of the first vertex, the collocated vertex being positioned at a relative same location in the reference frame as the first vertex of the base mesh in the current frame.

* * * * *